United States Patent [19]

Lamela et al.

[11] Patent Number: 5,186,284
[45] Date of Patent: Feb. 16, 1993

[54] FAIL SAFE SELF-ADJUSTING DISC BRAKE

[75] Inventors: Anthony J. Lamela, Gilberts, Ill.; Thomas F. Christensen, Twin Lakes; David T. Rach, Wausau, both of Wis.

[73] Assignee: Case Corporation, Racine, Wis.

[21] Appl. No.: 708,584

[22] Filed: May 31, 1991

[51] Int. Cl.$^5$ .................. F16D 55/02; F16D 66/00; F16D 65/24

[52] U.S. Cl. .................. 188/71.8; 188/1.11; 188/72.3; 188/170; 188/196 P; 192/30 W; 192/111 A

[58] Field of Search .......... 188/71.5, 71.7, 71.8, 188/1.11, 72.4, 72.3, 170, 151 A, 196 R, 196 A, 196 P; 303/9; 192/111 A, 30 W, 70.25, 85 AA, 83

[56] References Cited

U.S. PATENT DOCUMENTS

| | | | |
|---|---|---|---|
| 2,082,277 | 6/1937 | Dierfeld | 188/152 |
| 2,545,276 | 3/1951 | Hagedorn | 188/79.5 |
| 3,018,852 | 1/1962 | Stanton | 188/1.11 X |
| 3,260,331 | 7/1966 | Borman, Jr. | 188/72 |
| 3,403,754 | 10/1968 | Barrett et al. | 188/71.5 |
| 3,533,491 | 10/1970 | Svenson | 188/1.11 |
| 3,547,233 | 12/1970 | Girvan | 188/196 A X |
| 3,604,865 | 9/1971 | Bricker | 188/1.11 X |
| 3,613,839 | 10/1971 | MacDuff | 188/170 |
| 3,630,093 | 12/1971 | Morse | 188/170 X |
| 3,661,230 | 5/1972 | Burnett | 188/170 X |
| 3,696,898 | 10/1972 | Sommer | 192/18 A |
| 3,770,085 | 11/1973 | Cottingham | 188/170 X |
| 3,833,095 | 9/1974 | Engle | 188/71.9 |
| 3,946,837 | 3/1976 | Houser | 188/72.4 |
| 3,974,896 | 8/1976 | Rach | 188/170 |
| 4,014,579 | 3/1977 | Dubois | 188/170 X |
| 4,018,140 | 4/1977 | Engle | 188/170 X |
| 4,050,548 | 9/1977 | Margetts | 188/196 P X |
| 4,192,405 | 3/1980 | Lee et al. | 188/170 |
| 4,194,606 | 3/1980 | Beneke | 188/1.11 X |
| 4,263,991 | 4/1981 | Morgan et al. | 188/72.3 X |
| 4,382,491 | 5/1983 | Chun | 188/71.8 |
| 4,607,730 | 8/1986 | Paisley | 188/170 |
| 4,645,039 | 2/1987 | Lewis et al. | 188/72.3 |
| 4,776,438 | 10/1988 | Schandelmeier | 188/1.11 |
| 4,945,818 | 8/1990 | Ware | 188/1.11 X |
| 5,076,401 | 12/1991 | Ta et al. | 188/170 X |

FOREIGN PATENT DOCUMENTS 0013815  4/1972  Japan .................. 188/1.11

Primary Examiner—Douglas C. Butler
Assistant Examiner—Josie A. Ballato
Attorney, Agent, or Firm—Jansson & Shupe, Ltd.

[57] ABSTRACT

A fail safe self-adjusting brake is disclosed in which a service piston selectively actuates brake discs to contact shaft discs and apply braking to the shaft. The service piston is hydraulically actuated. Should there be a system failure an emergency piston forces the service piston to brake shaft rotation. The service and emergency pistons are uniquely mounted such that they are properly guided within the brake housing. In a further feature of the present invention, the location of the brake discs relative to the shaft discs is adjustable to vary the amount of movement necessary to cause braking. This adjustment allows the brake discs to move relative to the housing to accommodate wear on the brake or shaft discs. A gage is mounted within the housing to monitor the amount of adjustment of the brake discs, and thus to give an indication of the wear on those discs.

8 Claims, 2 Drawing Sheets

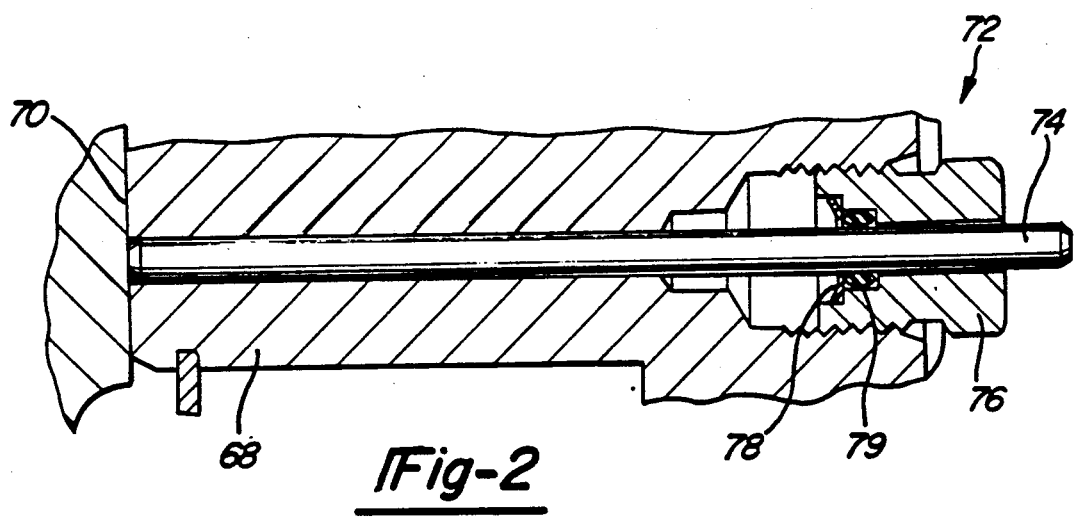
Fig-2
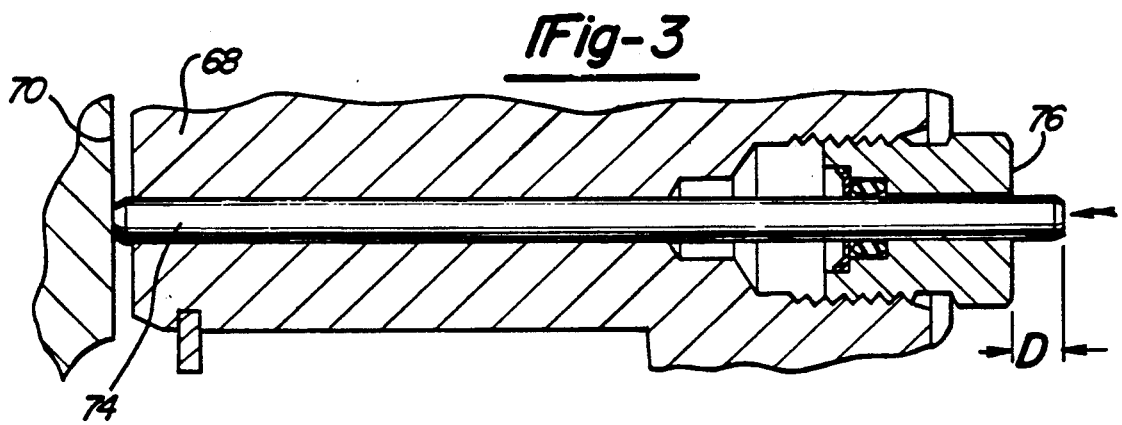
Fig-3
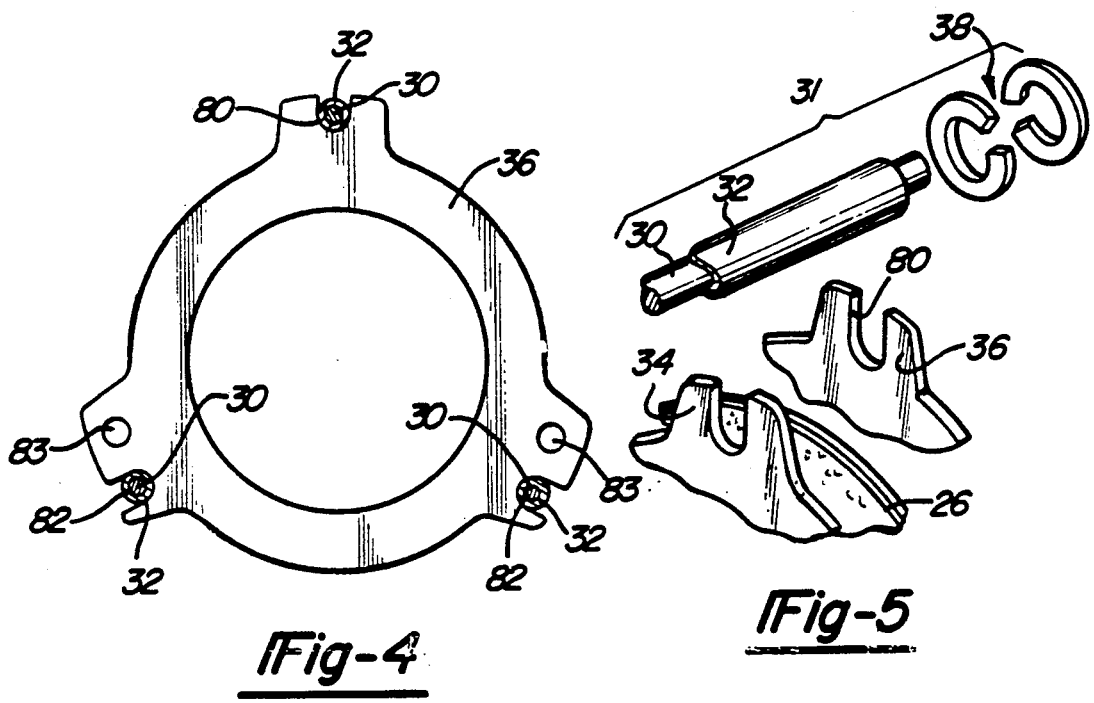
Fig-4
Fig-5

FAIL SAFE SELF-ADJUSTING DISC BRAKE

BACKGROUND OF THE INVENTION

This application in general relates to a brake which has improved mounting structure, is self-adjusting for wear on the discs, and gives an indication to the operator of the amount of wear on the discs.

Hydraulically actuated brakes are known in which an emergency piston detects a failure of the hydraulic system and causes a service piston to move in a direction to apply braking. It would be desirable to simplify the mounting of the pistons, and assure efficient and properly aligned transmission of force between the emergency piston and the service piston.

Prior art brakes experience wear on the mating brake and shaft discs. The prior art includes various gages to monitor the degree of wear. Further, the prior art may have included adjustable mounting such that the position of the brake disc changed to accommodate wear. A reliable structure for adjusting the position of the brake discs to accommodate wear is desirable. Further, in a brake where the position of the brake discs is adjustable to accommodate wear, it is desirable to have a gage to monitor the amount of adjustment.

SUMMARY OF THE INVENTION

A unique mounting structure for brake service and emergency pistons is disclosed that ensures the two operate smoothly and properly to apply braking. Further, a self-adjusting disc structure is disclosed in combination with an easily usable gage. The gage provides a brake that may be easily monitored by an operator to determine when maintenance is required.

In a disclosed embodiment of the present invention, a brake housing includes a shaft that is rotatable about an axis and has at least one shaft disc extending radially outwardly from the axis. At least one brake disc is mounted within the housing and constrained from rotating. A service piston is selectively movable against an end brake disc, or separator plate, to force it into contact with the end shaft disc and apply braking. An emergency piston is biased against the service piston to force the end brake disc against the shaft disc, even in the absence of a signal to apply braking, when the emergency piston senses a system failure. The emergency piston may also be actuated as a parking brake. The housing includes an inner cylindrical bore which receives the pistons and discs, and has a boss extending radially inwardly from the inner cylindrical bore. The service piston and emergency piston both have cylindrical sleeves which slidably contact the inner periphery of the boss to properly guide the pistons for movement within the housing, and ensure that the forces between the two are properly aligned. The service and emergency pistons have abutting end faces with no overhang. This reduces the required axial length of the overall brake, and also allows the radial size of the pistons to be easily varied.

In a preferred embodiment of the present invention the service piston selectively receives hydraulic fluid to bias it into the brake disc and apply braking. This piston is actuated by a master cylinder, or a brake valve. A separate hydraulic line directs hydraulic fluid to bias the emergency piston in a direction away from the service piston. The separate hydraulic lines insure maximum torque capacity for both the service and emergency pistons. A spring biases the emergency piston in a direction towards the service piston. An absence of hydraulic fluid biasing the emergency piston allows the spring to force the emergency piston against the service piston, and apply braking to the shaft. The absence of hydraulic fluid biasing the emergency piston, which could be a system failure or a parking brake signal, is a system condition to which the emergency piston responds.

In a further feature of the present invention, the brake disc is constrained from rotation by being mounted on at least one dowel. Although a cylindrical dowel is disclosed, it should be understood that this invention is not limited to any cross-sectional shape for the dowel. A tube is disposed between the dowel and the brake disc. The tube carries an abutment member defining a position for the brake disc. The abutment member is preferably formed by a ring which transfers force between the tube and the end brake disc. The service piston forces the end brake disc against the abutment member, and should there be a braking signal applied to the service piston, it will shift the brake disc and the abutment member in a direction towards the shaft disc, and apply braking. The position of the abutment member on the tube defines the amount of movement of the service piston prior to braking. There is a limited amount of such movement allowed by the mounting of the tube. The position of the abutment member is adjustable along the tube to define an adjusted position for both the abutment member and the brake disc. This adjustment of the abutment member allows the brake structure to accommodate wear on the shaft and brake discs.

In a preferred embodiment of the present invention, a spring normally biases the tube in a direction towards the service piston. The service piston overcomes that spring force when a braking signal is applied, either normally, or by the emergency piston when it senses a system failure. The tube spring force normally moves the tube and the abutment member against one face of the end brake disc, while the service piston normally abuts the opposed face of the end brake disc. The abutment member is normally frictionally engaged on the tube.

Under normal system operation the service piston forces the abutment and tube together against the spring biasing the tube to allow the brake discs to contact the shaft discs. When this normal movement does not achieve contact between the shaft disc and the end brake disc, the service piston forces the brake disc further relative to the tube. When this force is applied, the abutment member adjusts its axial position on the tube until the end brake disc does contact the shaft disc, and braking is applied. When the braking signal is released the tube returns to its normal position, but the abutment member maintains its adjusted position. Most preferably, the abutment member is formed by a pair of c-shaped snap rings. The snap rings are preferably of the type available under the trademark GRIPRING TM from Waldes Truarc.

In a further embodiment of the present invention a gage monitors the position of the service piston within the housing to give an indication of the adjusted position of the brake discs, which is in turn an indication of the amount of wear on the discs. In a preferred embodiment of the present invention, the gage extends through the housing, and abuts an end face of the emergency piston. By inserting the gage into the housing when braking is applied, an operator has a visual indication of the relative position of the emergency piston, the service piston, the brake discs and thus the amount of wear on the discs. In a preferred embodiment, the gage is sized such that when it still partially extends outwardly of the housing when forced inwardly, the operator is given an indication that sufficient surfaces remain on the discs for continued operation. If the gage extends entirely into the housing, then the operator has an indication that repair or replacement of the discs is advisable.

These and other objects and features of the present invention can be best understood from the following specifications and drawings of which the following is a brief description.

BRIEF DESCRIPTION OF THE DRAWINGS

FIG. 2 is a cross-sectional view of the gage during non-braking, such view being taken along line 2—2 as shown in FIG. 1.

FIG. 3 is a view similar to FIG. 2, but showing the gage position during braking.

FIG. 4 is a partial cross-sectional view along line 4—4.

FIG. 5 is an assembly view of a portion of the brake illustrated in FIG. 1.

DETAILED DESCRIPTION OF A PREFERRED EMBODIMENT

Figure 1:
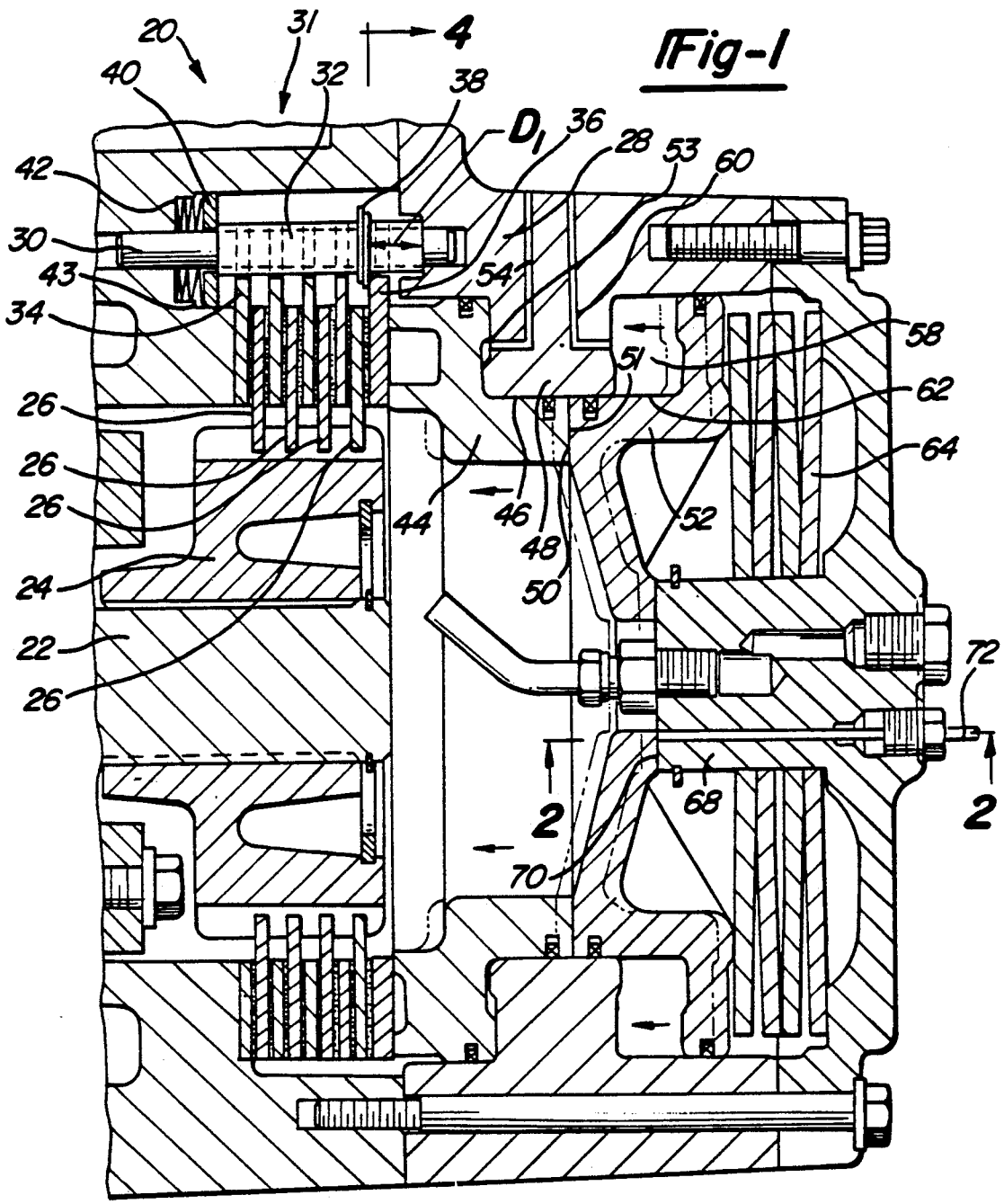
FIG. 1 is a cross-sectional view through a brake according to the present invention.

Brake 20 is illustrated in FIG. 1 for braking rotation of shaft 22. Shaft 22 has hub 24 which carries a plurality of radially outwardly extending discs 26. Housing 28 receives dowel 30 which carries adjustable brake actuation structure 31. Structure 31 includes tube 32 which can slide axially relative to dowel 30 and carries a plurality of brake discs 34. A separator plate or end brake disc 36 is also carried on tube 32.

Discs 34 and 36 each have a plurality of slots, as will be explained below with reference to FIG. 4, each of which is received on a tube 32, and the discs are axially movable relative to tubes 32, but prevented from rotating by tubes 32, dowel 30 and other dowels, disclosed below. Structurally discs 34 and 36 are identical. End disc 36 normally contacts adjustable abutment or gripper ring 38 which is frictionally engaged on the outer surface of tube 32. Gripper ring 38 is preferably formed from two snap rings. Disc 36 can move against ring 38 and cause tube 32 to move to the left as shown in this figure against washer 40. Washer 40 compresses a Belleville spring 42, which normally biases washer 40 and tube 32, to the right as shown in this figure, against disc 36. Washer 40 can move to the left a limited distance before contacting stop 43 which prevents further movement of washer 40.

Service piston 44 may be forced to the left, as shown in this figure, against end brake disc 36, which in turn contacts ring 38, thus forcing tube 32 to the left, and compressing Belleville spring 42. Movement of end brake disc 36 to the left eventually causes a left face of end brake disc 36 to contact a right face of the first shaft disc 26. Further, the force from end brake disc 36 against first shaft disc 26 causes the first shaft disc 26 to engage the next brake disc 34. The subsequent shaft and brake discs cascade engagement, as is well-known, to prevent further rotation of shaft 22. Discs 34 and 36 are free-floating on tube 32. Hydraulic fluid within housing 28 cause those discs to be properly spaced from shaft discs 26, and separated from each other by approximately equal distances.

Service piston 44 includes an axially extending cylindrical sleeve 46 which is received on boss 48 extending radially inwardly from the inner periphery of housing 28. Boss 48 defines a bore at its inner periphery that is generally cylindrical. End 50 of service piston 44 normally contacts a sleeve front face 51 of emergency piston 52. A hydraulic fluid chamber is defined by boss 48 and service piston 44 and receives hydraulic fluid from line 54 upon a braking signal to cause leftward movement of service piston 44 and actuation of brake 20. Emergency piston 52 and boss 48 define a similar fluid chamber 58 which receives hydraulic fluid from a separate line 60. Emergency piston 52 includes cylindrical sleeve 62 which is slidably received in contact with the inner periphery of boss 48. The combined mounting of the sleeves from service piston 44 and emergency piston 52 on boss 48, combined with the abutting contact faces 50 and 51 on boss 48 ensure that pistons 44 and 52 are properly guided, and the forces directed between them are properly aligned.

When it is desired to apply braking to the rotation of shaft 22, hydraulic fluid is sent into chamber 53 through line 54. This forces service piston 44 to the left against end brake disc 36, which in turn forces ring 38 to the left. Ring 38 moves with tube 32 to the left against Belleville spring 42. This allows leftward movement of end disc 36 until it contacts shaft disc 26, which causes braking of shaft 22, as described above.

Spring 64 biases emergency piston 52 to the left, as shown in this figure, such that end face 51 contacts end face 50 of service piston 44. In the absence of hydraulic fluid in chamber 58, spring 64 will force emergency piston 52 such that it actuates service piston 44 to brake the rotation of shaft 22 in the absence of a braking signal, or hydraulic pressure in chamber 53. Thus, should there be an absence of hydraulic fluid in chamber 58, spring 64 will force emergency piston 52 to actuate service piston 44 and apply braking to shaft 22. This provides fail-safe operation monitoring the operation of the hydraulic system, and causing braking should there be failure in that hydraulic system. This prevents operation of shaft 22 when there is a failure in the hydraulic system, which would prevent the brake 20 from operating properly. Solenoid valve may preferably be disposed to open and allow flow into line 60. If an electric failure is detected in the system this solenoid valve may then be closed. This would prevent flow of hydraulic fluid into chamber 58, allowing the emergency piston to move and actuate the brake. Thus, not only are hydraulic system failure detected, but also failures in other portions of the brake system. Further, when it is desired to apply the parking brake, the hydraulic fluid may be disconnected from chamber 58 by closing the solenoid valve.

In a normal position, the spring forces of the Belleville spring 42, the spring 64, and the force resulting from pressure normally within fluid chamber 58 are selected such that Belleville spring 42 normally maintains tube 32 and ring 38 resting against end brake disc 36, which is in turn resting against service piston 44. End face 50 of service piston 44 normally abuts end face 51 of emergency piston 52. End brake disc 36 is spaced from shaft disc 26. The application of fluid to hydraulic fluid chamber 53 causes service piston 44 to overcome the force of Belleville spring 42 and move end brake disc 36 to the left. The lack of hydraulic fluid in hydraulic fluid chamber 58 allows spring 64 to move emergency piston 52 against service piston 54, and overcome Belleville spring 42, thus moving end disc 36 to the left. In a sense, ring 38 provides an abutment against movement of end disc 36 until Belleville spring 42 is overcome. Stop 43 limits the amount of movement of tube 32. Should that limited amount of movement be insufficient to allow end brake disc 36 to contact shaft disc 26, as can happen when there is wear on either of the discs 26, 36 then ring 38 can adjust its position along tube 32, allowing adjustment of the amount of movement that end brake disc 36 can move through. Ring 38 is a first distance $D_1$ from a right end of tube 32. This distance changes as ring 38 adjusts.

Boss 68 extends axially inwardly from an outer face of housing 28 and abuts end face 70 of emergency piston 52. A gage assembly 72 extends through boss 68 and monitors the axial location of end face 70, which will give an operator an indication of the amount of wear on brake 20. As ring 38 is adjusted relative to tube 32, the position of service piston 44 during braking also changes, such that the braking position of emergency piston 52 changes. An operator can thus monitor gage 72, and having an easily readable indication as to the internal position of emergency piston 52, which in turn gives an indication of the position of service piston 44, and ring 38, which is indicative of the amount of wear on the discs.

Details of gage 72 are illustrated in FIG. 2. Pin 74 extends through nipple 76 in the outer casing wall, such that it has an end visible from outside of brake 20. Retainer ring 78, and O-ring seal 79 frictionally engage pin 74. Pin 74 extends through boss 68 and contacts end face 70. As shown, end face 70 is abutting an end face of boss 68, which may be the case in a typically non-braking situation.

FIG. 3 shows the position of end face 70 in a braking situation. As can be seen, end face 70 is slightly spaced from the end face of boss 68. Pin 74 can now could be inserted further into nipple 76 by an operator. As shown, pin 74 still extends outwardly of nipple 76 by a distance D. In a preferred embodiment, the size and arrangement of the various members is selected such that when pin 74 extends outwardly of nipple 76 when braking is applied, an operator will have an indication that the discs still has sufficient surface for continued use. Should pin 74 be entirely insertable within nipple 76, an operator would then have an indication that discs repair or replacement may be advisable.

FIG. 4 is an end view of end disc 36 showing slot 80 received on tube 32. A similar pair of slots 82 are spaced circumferentially from slot 80 and contain tubes and adjustable structure as that used on slot 80. Two other holes 83 typically extend freely over two other dowels, which are not illustrated. A combination of the dowels extending through holes 83, and dowel 30 with tubes 32 received in slots 80 and 82 prevent rotation of discs 36. Discs 34 are mounted in a similar fashion.

Adjustment apparatus 31 is illustrated in FIG. 5. Disc 34 is spaced from end disc 36 by shaft disc 26. Braking surfaces are formed on the abutting faces of the discs 34, 26 and 36. Dowel 30 mounts tube 32, and further receives ring 38, which is preferably formed from two c-shaped snap rings. Ring 38 is frictionally engaged on tube 32, and normally causes tube 32 to move to the left against Belleville spring 42. If tube 32 moved through the limited amount of movement allowed by stop 43 and end disc 36 is not yet engaging the first shaft disc 26, then the force from service piston 44 will continue to move ring 38 relative to tube 32 such that it adjusts its position along tube 32. Eventually, end disc 36 will contact shaft disc 26 and braking will be applied to shaft 22. When braking is released, ring 38 remains at its adjusted position.

Figure 6:
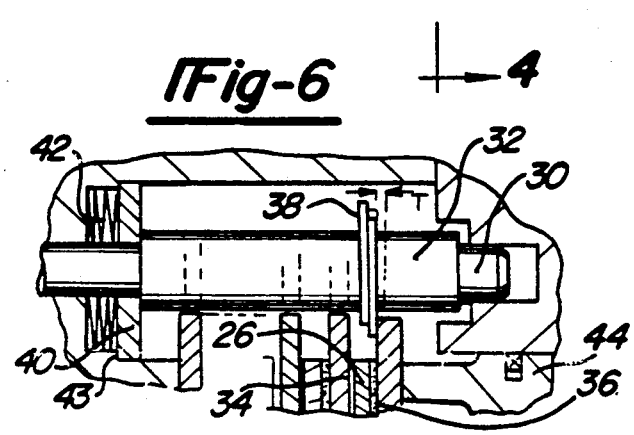
FIG. 6 is an enlarged cross-sectional view of a portion of the brake illustrated in FIG. 1.

As shown in FIG. 6, transfer ring 38 moves a small distance T when braking is applied. Disc 36 is now in contact with disc 26. In this position washer 40 abuts stop 43. When the braking force is released and the service piston 44 is no longer applying a force against end disc 36, the Belleville spring 42 will return tube 32 to the right as shown in this figure, which will in turn move end disc 36 and service piston 44 to the right.

Figure 7:
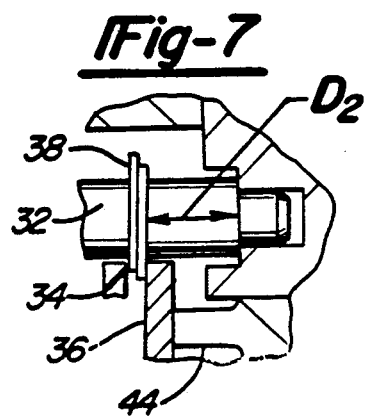
FIG. 7 is an enlarged view of a portion of the brake illustrated in FIG. 6.

With wear on the discs, disc 36 may not contact disc 26 before washer 40 abuts stop 43. If so, ring 38 adjusts its position on tube 32 as shown in FIG. 7 such that it is spaced a distance $D_2$ from the right end of tube 32. When braking is released ring 38 remains at the newly adjusted position on tube 32. Thus, the next time braking is applied, ring 38 is at the adjusted position to apply braking. Since, Belleville spring 42 forces tube 32 to the right, as shown in this figure, until ring 38 abuts end disc 36, there is clearance in the mounting of both washer 40 and dowel 30 to provide for the above-described adjustment, allowing further movement of both members to the right as shown in this figure.

A preferred embodiment of the present invention has been disclosed, however, a worker of ordinary skill in the art would recognize that certain modifications would come within the scope of this invention. For that reason, the following claims should be studied in order to determine the true scope and content of this invention.

We claim:

1. In a brake assembly having a primary service braking piston movable to urge rotating and non-rotating discs against one another for braking rotation of a shaft, the improvement comprising:

a plurality of tubes mounted for movement during braking, each tube being spring-biased toward the piston and tube movement during braking being limited by a stop;

a plurality of abutments retaining the piston at a non-braking position, each abutment being mounted on a tube and comprising a frictionally-mounted ring slidable on its respective tube to compensate for disc wear, whereby the distance moved by the piston from the non-braking position to a brake-applying position is substantially constant notwithstanding disc wear.

2. The improved assembly of claim 1 wherein the abutments slide along their respective tubes subsequent to stop-limited tube movement.

3. A brake comprising:

a housing having a dowel extending therethrough;

a shaft rotatable about an axis and having at least one shaft disc extending radially outwardly;

a brake disc spaced from said shaft disc, constrained by the dowel against rotation and movable along the dowel and into engagement with the shaft disc to apply braking to stop rotation of the shaft;

a tube disposed between the dowel and the brake disc and having an abutment member mounted on and movable on the tube and located on one side of the brake disc;

a service piston forcing the brake disc against the abutment member when the brake disc moves through a distance to contact the brake disc, force the brake disc into contact with the shaft disc and apply braking torque to the shaft, the distance being determined by the position of the abutment member on the tube and being substantially constant notwithstanding disc wear;

an emergency piston biased by a bias member to force the service piston against the brake disc to provide a parking brake; and a housing enclosing a portion of the shaft, the shaft disc, the brake disc, the service piston and the emergency piston, the housing having an inner cylindrical bore with a boss extending radially inwardly from the bore, the service piston and the emergency piston each having cylindrical sleeves slidably contacting an inner periphery of the boss to properly guide the service and emergency pistons for movement within the housing.

4. A brake as recited in claim 3, wherein a tube spring biases the tube in a direction toward the service piston, and the service piston overcomes the spring to move the tube and the abutment member and to move the brake disc into contact with the shaft disc and apply braking.

5. A brake as recited in claim 4 wherein the abutment member is frictionally mounted on the tube, tube movement is limited by a tube stop and the abutment member slides on the tube subsequent to stopped tube movement, thereby adjusting the brake to compensate for disc wear.

6. The brake of claim 5 further including a gage extending outwardly of the housing, and movable inward toward the housing to indicate the magnitude of disc wear.

7. The brake of claim 4 further including a gage extending outwardly of the housing, and movable inward toward the housing to indicate the magnitude of disc wear.

8. The brake of claim 3 further including a gage extending outwardly of the housing, and movable inward toward the housing to indicate the magnitude of disc wear.

* * * * *